No. 711,856. Patented Oct. 21, 1902.
G. D. HERMANN & D. SCHUSTER.
PARCEL GRIPPER.
(Application filed Jan. 23, 1902.)
(No Model.)
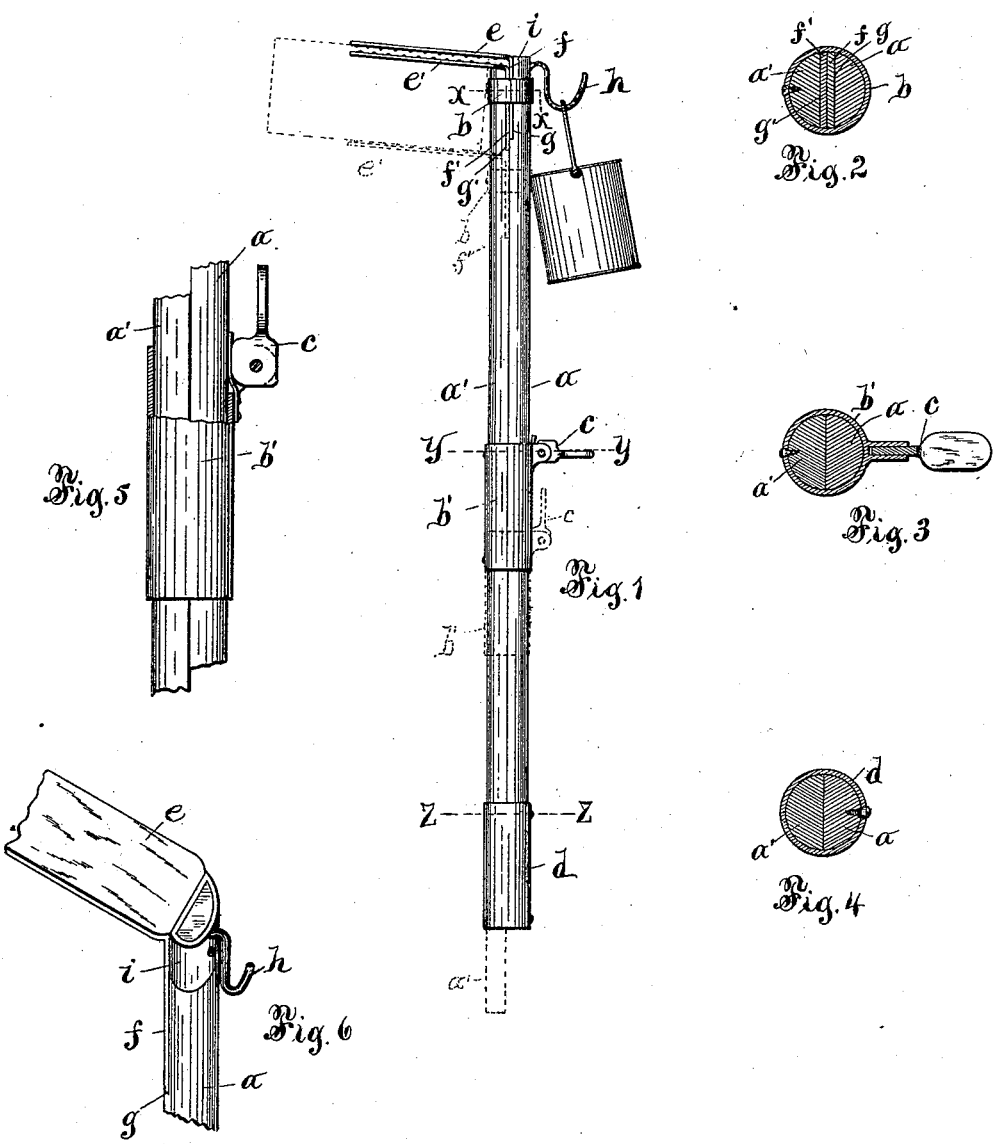
WITNESSES:
INVENTORS:
Gustav D. Hermann
Daniel Schuster
By E. Laass
ATTORNEY.

UNITED STATES PATENT OFFICE.

GUSTAV D. HERMANN AND DANIEL SCHUSTER, OF ONEIDA, NEW YORK.

PARCEL-GRIPPER.

SPECIFICATION forming part of Letters Patent No. 711,856, dated October 21, 1902.

Application filed January 23, 1902. Serial No. 90,979. (No model.)

*To all whom it may concern:*

Be it known that we, GUSTAV D. HERMANN and DANIEL SCHUSTER, citizens of the United States, and residents of Oneida, in the county of Madison, in the State of New York, have invented new and useful Improvements in Parcel-Grippers, of which the following, taken in connection with the accompanying drawings, is a full, clear, and exact description.

The object of this invention is to provide a simple, inexpensive, convenient, and efficient implement for removing in a careful and proper manner various parcels or articles from elevated shelves or other supports, as is frequently required in stores dealing in merchandise stowed on shelves or disposed on hooks or brackets or other devices projecting from the wall or other parts of the store and at an inconvenient elevation from the floor; and to that end the invention consists in novel features of the detail construction of the aforesaid implement, all as hereinafter more fully described, and shown in the annexed drawings, in which—

Figure 1 is a side view of our invention, illustrating in dotted lines its adjustability for removing from shelves articles of different thicknesses and for removing articles from an elevated support from which they are suspended, Figs. 2, 3, and 4 are enlarged transverse sections on lines X X, Y Y, and Z Z, respectively. Fig. 5 is an enlarged detail view of the clamp, and Fig. 6 is an enlarged perspective view of the upper end of the main handle.

Similar letters of reference indicate corresponding parts.

$a$ and $a'$ represent, respectively, a primary and a supplemental handle, both of which are prolonged and disposed contiguously side by side, the supplemental handle $a'$ extending lengthwise of the primary handle $a$ and sustained movable longitudinally thereon by means of sleeves $b$ and $b'$, fastened to the supplemental handle and embracing the primary handle. To one of said sleeves is connected a cam-lever or other suitable clamp $c$, by means of which the said two handles are adjustably locked to each other. Another sleeve $d$ is attached to the end of the primary handle and embraces the supplemental handle to afford a hold for the manipulator in sliding one upon the other of said handles. To the opposite end of the primary handle is affixed a laterally-projecting jaw $e$, consisting, preferably, of a flat plate formed at one end with a shank $f$, projecting at right angles therefrom and seated in a mortise $g$, formed in the side of the primary handle $a$, facing the supplemental handle. The shank $f$ is perforated for the reception of screws, by which the shank is fastened to the handle. The corresponding end of the supplemental handle is provided with a laterally-projecting jaw $e'$, facing the jaw $e$ and fastened to the supplemental handle by means of a shank $f'$, seated in a mortise $g'$ in the side of said handle and perforated for the attaching-screws. The opposing faces of the two jaws $e$ $e'$ are serrated or roughened to permit them to obtain a secure hold on the article gripped between said jaws.

The sleeve $b$ is attached to the supplemental handle $a'$ adjacent to the jaw $e'$ to effectually support said jaw on the main handle $a$ and maintain it in parallelism with the jaw $e$. The sleeve $d$ also affords a hold for the hand of the manipulator in adjusting the two jaws $e$ $e'$ into a position for gripping the parcel or article designed to be removed from the elevated shelf.

To allow the handle $a$ with its adjustable supplemental handle $a'$ to be used for removing an article from a hook or nail or other device at an inconvenient elevation, we provide the upper end of the primary handle $a$ with a hook $h$, preferably secured thereto by a band $i$, formed on the attaching end of said hook and embracing the back of the handle and receiving through it the screw which fastens the jaw-shank to said handle.

It will be observed that the supplemental handle $a'$ constitutes an adjustable extension of the primary handle $a$ and renders the combined handles very convenient for the use of the hook $h$ and for the adjustment and use of the jaws $e$ $e'$.

What we claim as our invention, and desire to secure by Letters Patent, is—

The combination of a prolonged primary handle and a longitudinally-movable supplemental handle provided on their adjacent sides and corresponding ends with longitudinal mortises, jaws formed with right-angular extending shanks seated in said mortises and perforated, screws passing through the perforations and fastening the shanks to said handles, sleeves fastened to the supplemental handle and embracing the primary handle, a clamp connected to one of said sleeves and engaging the primary handle, and a sleeve attached to the end of the primary handle and embracing the supplemental handle substantially as described and shown.

GUSTAV D. HERMANN. [L. S.]
DANIEL SCHUSTER. [L. S.]

Witnesses:
HENRY ERNENWEIN,
JOSEPH BEAL.